US008240703B2

United States Patent
Yeon et al.

(10) Patent No.: US 8,240,703 B2
(45) Date of Patent: Aug. 14, 2012

(54) AIRBAG DOOR CONNECTING STRUCTURE OF PASSENGER SEAT IN VEHICLE

(75) Inventors: Dong Won Yeon, Hwaseong-si (KR); Sug Dae Chang, Yongin-si (KR)

(73) Assignees: Kia Motors Corporation, Seoul (KR); Hyundai Mobis Corporation, Seoul (KR)

( * ) Notice: Subject to any disclaimer, the term of this patent is extended or adjusted under 35 U.S.C. 154(b) by 474 days.

(21) Appl. No.: 12/549,988

(22) Filed: Aug. 28, 2009

(65) Prior Publication Data

US 2010/0295275 A1 Nov. 25, 2010

(30) Foreign Application Priority Data

May 22, 2009 (KR) .......................... 10-2009-0044793

(51) Int. Cl.
*B60R 21/215* (2011.01)
(52) U.S. Cl. .................................................... 280/728.3
(58) Field of Classification Search ............... 280/728.3, 280/732; 701/45; 264/297.1–297.4, 297.8, 264/297.9, 308, 328.1, 328.8
See application file for complete search history.

(56) References Cited

U.S. PATENT DOCUMENTS

| 2006/0017268 A1* | 1/2006 | Bondoerffer | 280/732 |
| 2007/0013172 A1* | 1/2007 | Haba et al. | 280/728.3 |
| 2008/0048419 A1* | 2/2008 | Kong | 280/728.3 |

* cited by examiner

*Primary Examiner* — Paul N Dickson
*Assistant Examiner* — Timothy Wilhelm
(74) *Attorney, Agent, or Firm* — Morgan, Lewis & Bockius LLP

(57) ABSTRACT

An airbag door connecting structure of a passenger seat of a vehicle may include a crash pad formed with interior finishing material of a dash board extending over a front surface of a passenger seat; a housing disposed to a lower portion of the crash pad, wherein a space is defined between the housing and the crash pad in which a passenger airbag (PAB) is installed; a chute coupled to the crash pad by vibration welding outside the housing and couples the housing to the crash pad; and an airbag door disposed in the chute and covering the space of the housing, the airbag door having a hinge portion which is bent inwards so as to elastically rotate about a coupling portion of the hinge portion outwards by the passenger airbag in a crash accident of the vehicle, wherein the coupling portion is coupled to the housing and to the chute.

5 Claims, 1 Drawing Sheet

AIRBAG DOOR CONNECTING STRUCTURE OF PASSENGER SEAT IN VEHICLE

CROSS-REFERENCE TO RELATED APPLICATION

The present application claims priority to Korean Patent Application Number 10-2009-0044793 filed on May 22, 2009, the entire contents of which are incorporated herein for all purposes by this reference.

BACKGROUND OF THE INVENTION

1. Field of the Invention

The present invention relates to an airbag door structure, and more particularly, to an airbag door connecting structure of a passenger seat of a vehicle, which is opened when a passenger airbag deploys.

2. Description of Related Art

Generally, a PAB (Passenger Air Bag) is configured to expand and deploy from the inside of a crash pad to the outside thereof in order to minimize impact on a passenger of a passenger seat with a seatbelt in the case of a crash accident.

A conventional PAB system includes a crash pad which is coupled to an instrument panel and is formed with interior material over a whole front surface of a passenger seat, a housing which is fixed to a lower portion of the crash pad and defines a space between the crash pad in which the PAB is installed, a chute which is coupled to the crash pad by vibration welding outside the housing, and an airbag door one side of which is coupled to the chute by a bolt, has a hinge portion which is bent so as to easily rotate about a coupling portion and is coupled to the crash pad by heat welding to cover the housing.

As described above, according to the conventional PAB system, PAB gradually expand when a vehicle crash accident occurs, pressure acts on the door and thereby the door elastically rotates about the hinge portion so that a scoring line around the crash pad is torn by rotational force of the door and the PAB deploys outside.

However, since the chute and the airbag door are separately produced and coupled, the number of parts is increased and the manufacturing processes are added so that the productivity deteriorates, and in addition adding coupling means such as bolt causes increases weight of the product.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide an airbag door connecting structure of a passenger seat of a vehicle in which a chute and an airbag door are integrally formed to reduce the number of parts, thereby enhancing the productivity and reducing weight of the product by eliminating a coupling means.

In an aspect of the present invention, the airbag door connecting structure of a passenger seat of a vehicle may include a crash pad which is formed with interior finishing material of a dash board extending over a front surface of a passenger seat, a housing which is disposed to a lower portion of the crash pad, wherein a space is defined between the housing and the crash pad in which a passenger airbag (PAB) is installed, a chute which is coupled to the crash pad by vibration welding outside the housing and couples the housing to the crash pad, and an airbag door disposed in the chute and covering the space of the housing, the airbag door having a hinge portion which is bent inwards so as to elastically rotate about a coupling portion extending from the hinge portion of the airbag door outwards by the passenger airbag in a crash accident of the vehicle, wherein one side of the coupling portion is coupled to the housing and the other side thereof is coupled to the chute by vibration welding with an integration type resin member.

The housing may support the hinge portion upwards.

The chute may be formed by a first material which is harder than the airbag door made up of a second material, wherein the first material is PPF (PolyPropylene Fiber) and, wherein the second material is TPO (ThermoPlastic Olefin).

In another exemplary embodiment of the present invention, the chute and the airbag door may be formed by a two-shot injection molding process, wherein a partitioning plate is provided between the chute and the coupling portion of the airbag door to prevent a first material of the chute and a second material of the airbag door from being mixed when the first and second materials are injected by the two-shot injection molding process, wherein the first material is harder than the second material, wherein the first material is PPF (PolyPropylene Fiber), and wherein the second material is TPO (ThermoPlastic Olefin).

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
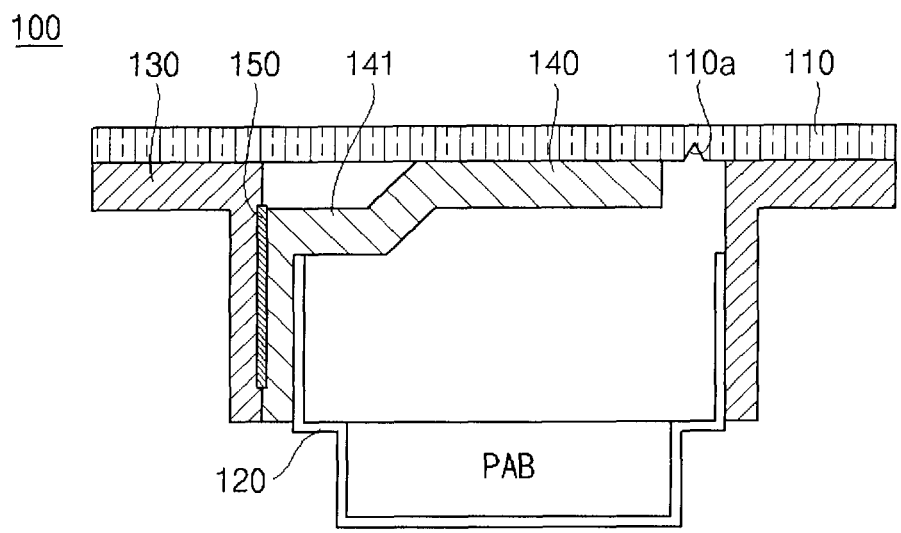
FIG. 1 is a sectional view of an exemplary airbag door connecting structure of a passenger seat of a vehicle according to the present invention.
Figure 2:
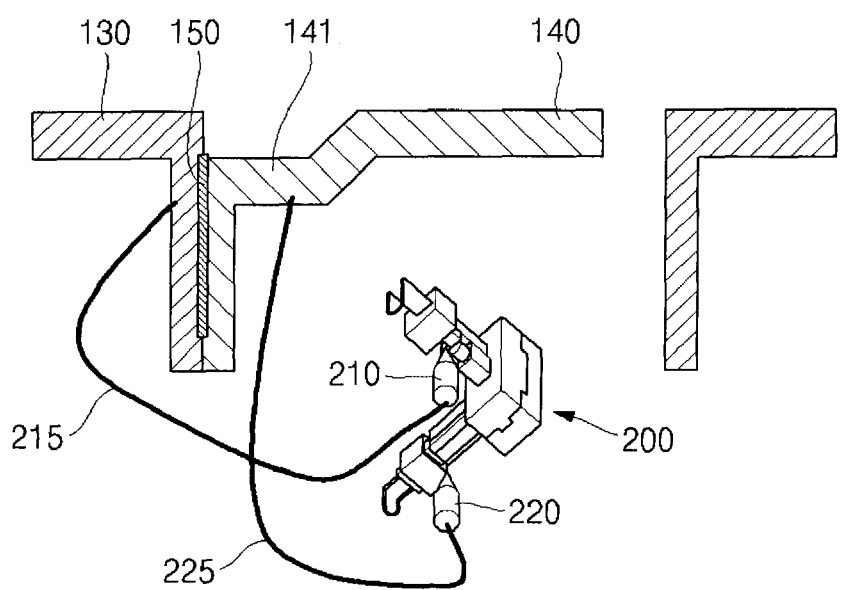
FIG. 2 is a drawing showing an exemplary two-shot injection molding process of a chute and an airbag door of FIG. 1.

FIG. 1 is a sectional view of an airbag door connecting structure of a passenger seat of a vehicle according to various embodiments of the present invention, and FIG. 2 is a drawing showing a two-shot injection molding process of a chute and an airbag door of FIG. 1.

As shown in FIG. 1, an airbag door connecting structure 100 of a passenger seat of a vehicle includes: a crash pad 110 which is formed with interior finishing material of a dash board extending over a whole front surface of a passenger seat; a housing 120 which is fixed to a lower portion of the crash pad 110 and defines a space between the crash pad 110 in which a passenger airbag (PAB) is installed; a chute 130 which is coupled to the crash pad 110 by a vibration welding outside the housing 120 and couples the housing 120 to the crash pad 110; and an airbag door 140, one end which is coupled to the chute 130 by an integration type resin member and having a hinge portion 141 which is bent so as to easily elastically rotate about a coupling portion, being coupled to the crash pad 110 by vibration welding, and covering the space of the housing 120.

At this time, the crash pad 110 is made of PPF(PolyPropylene Fiber) material with high strength, and a scoring line 110a is formed at a lower portion thereof by a laser forming so as to be easily torn by an upward rotation of the airbag door 140 according to deploy of PAB.

Furthermore, the chute 130, which is a coupling means, is preferably made of PPF (PolyPropylene Fiber) material with high strength like the crash pad 110.

On the other hand, the airbag door 140 is made of soft material such as TPO (ThermoPlastic Olefin) so that it has a small variation in the property of matter depending on temperature change and the operation performance thereof can be maintained even when temperature change occurs.

In particular, it is preferable to be made of soft material such that it is formed that elastic rotation can be easily performed at a bent hinge portion 141 of the airbag door 140 so that there is no problem in deploy of PAB.

Meanwhile, in order to couple the airbag door 140 to the chute with an integration type resin member, in various embodiments of the present invention, a two-shot injection molding process using a molding injection 200 will be explained with reference to the drawings hereinafter.

As shown in FIG. 2, in the molding injection 200, hard material is supplied to a cavity of a mold for forming the chute 130 from a hard material supplier 210 along a hard material supply line 215, and soft material is supplied to a cavity of a mold forming the airbag door 140 from a soft material supplier 220 along a soft material supply line 225, and two materials are simultaneously injected.

At this time, if two different resins are mixed shapelessly to be mixed, PPF having high flow characteristic permeates into TPO resin molten layer having relatively low resin flow characteristic in a state of not being solidified.

As such, if PPF which is hard material permeates into an area of the airbag door 140, elasticity of the bent hinge portion 141 of the airbag door 140 becomes non-uniform, and this makes it impossible for the airbag door 140 to quickly rotate during deploy of an airbag.

Accordingly, in various embodiments of the present invention, when the chute 130 and the airbag door 140 are formed by integration type resin member, a plate-shaped partitioning plate 150 is inserted between the chute 130 and the airbag door 140 in order to prevent the hard material and the soft material from being mixed while the two different resins are injected, thereby making the two-shot injection be partitioned at the coupling portion.

Material of the partitioning plate 150 can be selected among steel, PPF, TPO, and the shape thereof can be varied depending on the structure of the mold apart from the plate type.

For convenience in explanation and accurate definition in the appended claims, the terms "lower" and "upward" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An airbag door connecting structure of a passenger seat of a vehicle comprising:
    a crash pad which is formed with interior finishing material of a dash board extending over a front surface of a passenger seat;
    a housing which is disposed to a lower portion of the crash pad, wherein a space is defined between the housing and the crash pad in which a passenger airbag (PAB) is installed;
    a chute which is coupled to the crash pad by vibration welding outside the housing and couples the housing to the crash pad; and
    an airbag door disposed in the chute and covering the space of the housing, the airbag door having a hinge portion which is bent inwards so as to elastically rotate about a coupling portion extending from the hinge portion of the airbag door outwards by the passenger airbag in a crash accident of the vehicle, wherein one side of the coupling portion is coupled to the housing and the other side thereof is coupled to the chute by vibration welding with an integration type resin member,
    wherein the chute and the airbag door are formed by a two-shot injection molding process, and
    wherein a partitioning plate is provided between the chute and the coupling portion of the airbag door to prevent a first material of the chute and a second material of the airbag door from being mixed when the first and second materials are injected by the two-shot injection molding process.

2. The airbag door connecting structure of claim 1, wherein the housing supports the hinge portion upwards.

3. The airbag door connecting structure of claim 1, wherein the chute is formed by a first material which is harder than the airbag door made up of a second material.

4. The airbag door connecting structure of claim 3, wherein the first material is PPF (PolyPropylene Fiber).

5. The airbag door connecting structure of claim 3, wherein the second material is TPO (ThermoPlastic Olefin).

* * * * *